July 29, 1969   H. H. LITTLE   3,457,816

BLANKING AND SHAPING APPARATUS

Filed Dec. 14, 1966

INVENTOR,
HARRY H. LITTLE

United States Patent Office

3,457,816
Patented July 29, 1969

3,457,816
BLANKING AND SHAPING APPARATUS
Harry H. Little, 202 Cedar Lane,
Vienna, Va. 22180
Filed Dec. 14, 1966, Ser. No. 601,810
Int. Cl. B26f 1/14
U.S. Cl. 83—378                                4 Claims

ABSTRACT OF THE DISCLOSURE

A punch having cutting surfaces of a particular configuration is mated with a die having elastically filled channels which mate with and are identically shaped as, the cutting surfaces of the punch. The material to be blanked and shaped is placed between the punch and die and, because of the elastic support it receives in the die, it not distorted as it is worked on.

---

This invention relates to the metal blanking arts and in particular to a double acting cutting die and punch suited for blanking complex shapes from thin materials.

Many products require extremely thin materials, from .001 inch thickness and larger, shaped to a particular configuration. Because of the thinness of the material, and hence lack of resistance to plastic deformation, great care must be exercised in trying to blank and shape these materials. Prior art devices for blanking and shaping these materials typically required expensive multioperation dies and presses. Conventional blanking means cannot be used because they tend to distort the material being worked on. Distortion occurs during the cutting of the material because of the material's lack of resistance to deformation around the cutting areas due to its extreme thinness. It is obvious that any inexpensive method for blanking and shaping thin materials will find popular use.

It is therefore an object of the present invention to provide means to inexpensively blank and shape extremely thin materials.

It is a further object of the present invention to provide means to inexpensively blank and shape extremely thin materials without distorting the material being worked on.

Briefly, the present invention utilizes an opposed punch and die. Cutting portions on the punch mate with matched channels in the die. A rubber-like material is placed in the die channels and between the punch cutting areas. The material to be blanked is placed between the punch and die which are then brought towards each other under great pressure blanking the material. The channels and cutting portions can be shaped to obtain a particular configuration of the material being worked on.

The specific nature of the invention, as well as other objects, aspects, uses and advantages thereof, will clearly appear from the following description and from the accompanying drawing, in which.

Figure 1:
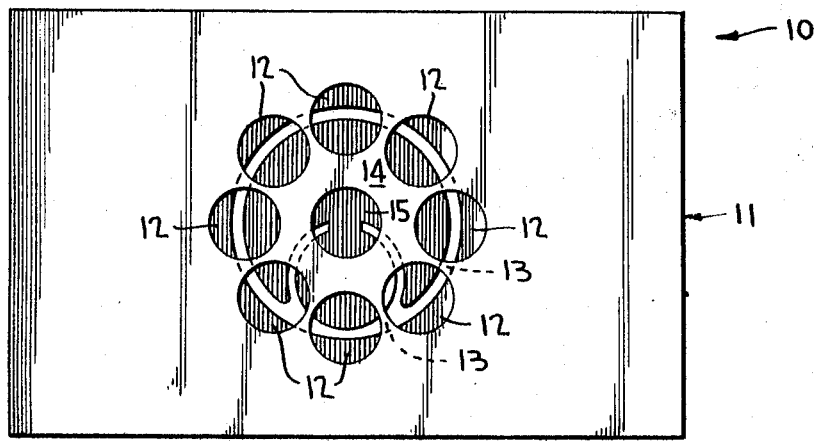
FIG. 1 is a bottom view of my novel die.
Figure 2:
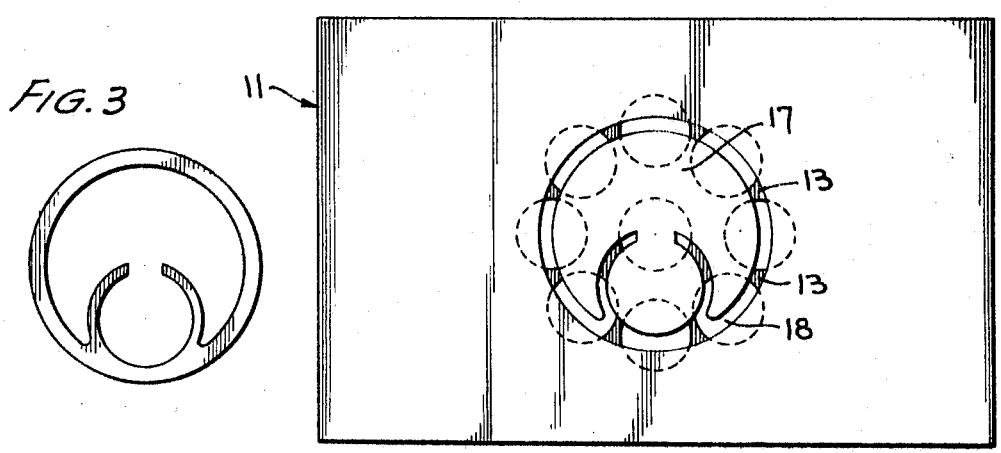
FIG. 2 is a top view of my novel die.

In FIG. 1 a bottom view of a die 10 is shown. Die 10 consists of a block 11, of any suitable material, having a plurality of relief holes 12 drilled therethrough. The holes are drilled to approximately the middle thickness of block 11. As is clearly seen in FIG. 1 the holes are placed along the circumference of an imaginary circle and are separated by webs 13. Inside relief holes 12, and defined by said holes, is a base area 14 integral with block 11 having a center relief hole 15 formed therein. In FIG. 2 a top view of block 11 shows face material 17 integral with block 11, by webs 13, and shaped to be surrounded by channels 18 which are the geometric configuration that the die is to produce. Channels 18 are machined voids in die 11 and are removed from the die in accordance with the following procedure.

In constructing my novel die the first step is to drill relief holes 12 and center hole 15 in the bottom of block 11. Holes 12 should be drilled to approximately the middle width of block 11. Channels 18 are machined from the top of block 11 by removing the material that is to be the channel and extend to web 13. The shape of channels 18 should conform to the configuration that is desired the material being worked on should finally be.

Figure 4:
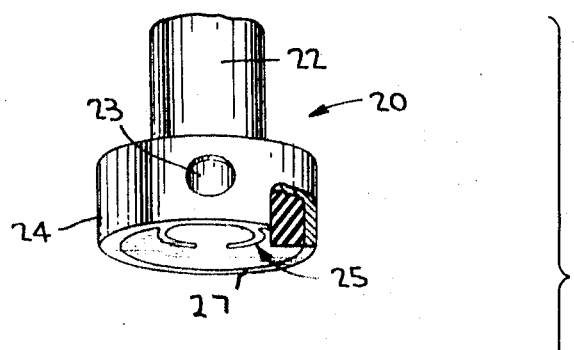
FIG. 4 shows a punch and die in cutting relation to each other.
Figure 4:
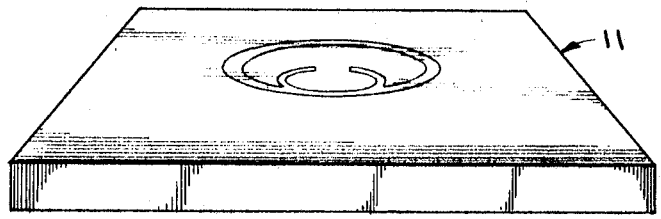

In FIG. 4 a punch 20 is shown having a power post 22 and a head 24. Head 24 is generally hollow throughout except for cutting surface 25 which extends through said head and is preferably integral with post 22. Cutting surface 25 and cutting circumference 27 at the end of head 24 away from post 22 are shaped to mate with channels 18 of die 11. Cutting surface 25 can be shaped by removing material from head 24 until the cutting surface material that remains conforms to the shape that it is desired to blank the material being worked on to. The void between cutting surface 25 and cutting circumference 27 is filled completely with rubber, preferably Hysol-CU17. The rubber fills the volume and is flush with the end of the head 24 away from post 22. Block 11 is similarly filled with a rubber-like material, preferably Hysol-CU17, so that the rubber is flush with the top and bottom of the block and all the internal cavities within the block are completely filled therewith.

The material that is to be blanked and shaped is placed between the punch and die and an appropriate force is applied to the two members. The material to be cut is depressed by cutting surfaces 25 and 27 of punch 20 into the rubber filled channels 18 of die 11. The rubber supports the material as it is forced into channels 18 while it is being sheared and thus eliminates any edge distortion of the material. Holes 12, 15, and 23 act as relief grooves for the elastic like rubber, allowing the rubber to expand slightly through the relief hole during punching operations to give the material being worked on a flexible support.

Figure 3:
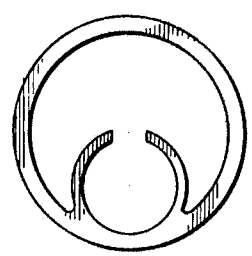
FIG. 3 is the configuration of material blanked and shaped by my invention as shown in FIGS. 1, 2 and 4.

My novel blanking and shaping apparatus has the advantage that it can easily be constructed making it feasible costwise for low run production jobs, and yet has the capabilities of being used in high run production jobs. While I have illustrated the shape of FIG. 3 that the material being worked on is to blanked to, it is obvious that this is for illustrative purposes only as the material being worked on could be blanked and shaped to any desired configuration.

It will be apparent that the embodiments shown are only exemplary and that various modifications can be made in construction and arrangement within the scope of the invention as defined in the appended claims.

I claim as my invention:

1. Apparatus to blank and shape a material to a particular configuration comprising:
   (a) a die having top and bottom sides, and having channels formed in the top side of said die which conform to said desired configuration,
   (b) a plurality of relief holes extending to the interior of said die from the bottom side thereof to a point directly adjacent and communicating with said channels, (c) an elastic rubber like material filling the channels of said die and relief holes, (d) a punch having cutting surfaces to mate with said channels and identically shaped as said channels.

2. A device according to claim 1 wherein said plurality of relief holes in said die define a plurality of webs.

3. A device according to claim 2 wherein face material in said die block is defined adjacent said channels and extends through said die.

4. A device according to claim 3 wherein said webs and said face material are integral with each other.

References Cited

UNITED STATES PATENTS

| 2,850,096 | 9/1958 | Berlin et al. | 83—641 |
| 3,167,985 | 2/1965 | Madsen | 83—139 |

ANDREW R. JUHASZ, Primary Examiner

JAMES F. COAN, Assistant Examiner

U.S. Cl. X.R.

83—139, 685